US012219343B2

(12) United States Patent
Harada

(10) Patent No.: US 12,219,343 B2
(45) Date of Patent: Feb. 4, 2025

(54) SIGNAL GENERATING APPARATUS, VEHICLE, AND COMPUTER-IMPLEMENTED METHOD OF GENERATING SIGNALS

(71) Applicant: YAMAHA CORPORATION, Hamamatsu (JP)

(72) Inventor: Hideki Harada, Kakegawa (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 18/604,952

(22) Filed: Mar. 14, 2024

(65) Prior Publication Data

US 2024/0223989 A1 Jul. 4, 2024

Related U.S. Application Data

(63) Continuation of application No. 17/832,791, filed on Jun. 6, 2022, now Pat. No. 12,010,503.

(30) Foreign Application Priority Data

Jul. 9, 2021 (JP) ................................ 2021-114159

(51) Int. Cl.
*H04R 5/02* (2006.01)
*H04R 5/04* (2006.01)
(Continued)

(52) U.S. Cl.
CPC ............... *H04S 7/303* (2013.01); *H04R 5/04* (2013.01); *H04S 3/002* (2013.01); *H04S 7/307* (2013.01);
(Continued)

(58) Field of Classification Search
CPC .......... H04S 7/303; H04S 3/002; H04S 7/307; H04S 2400/13; H04S 2420/01; H04R 5/04; H04R 2499/13
(Continued)

(56) References Cited

FOREIGN PATENT DOCUMENTS

WO WO-2021205601 A1 * 10/2021

OTHER PUBLICATIONS

Tomoya "Easy Multichannel Panner, Dbap Implemention" <https://matsuuratomoya.com/blog/2016-06-17/dbap-implementation/>. Jun. 17, 2016. Cited in the specification. English machine translation provided.

(Continued)

*Primary Examiner* — Ammar T Hamid
(74) *Attorney, Agent, or Firm* — ROSSI, KIMMS & McDOWELL LLP

(57) ABSTRACT

A signal generating apparatus includes: a memory configured to store instructions; and a processor communicatively connected to the memory and configured to execute the stored instructions to function as: a first generator configured to generate a processed signal by adjusting frequency characteristics of an audio signal representative of a sound from a virtual sound source based on a Head-Related Transfer Function (HRTF) corresponding to a target position of the virtual sound source; and a second generator configured to: generate, based on the processed signal generated by the first generator, a plurality of output signals in one-to-one correspondence with a plurality of loudspeakers; and perform panning processing to adjust a level of each output signal of the plurality of output signals based on the target position.

5 Claims, 6 Drawing Sheets

(51) Int. Cl.
*H04S 3/00* (2006.01)
*H04S 7/00* (2006.01)

(52) U.S. Cl.
CPC ...... *H04R 2499/13* (2013.01); *H04S 2400/13* (2013.01); *H04S 2420/01* (2013.01)

(58) Field of Classification Search
USPC .................................................. 381/300, 302
See application file for complete search history.

(56) References Cited

OTHER PUBLICATIONS

Office Action issued in U.S. Appl. No. 17/832,791, mailed Jan. 3, 2024.

* cited by examiner i1

| TARGET POSITION T1 OF VIRTUAL SOUND SOURCE (ANGLE q1) | SET C OF HRTFS | |
|---|---|---|
| | R-HRTF 601 | L-HRTF 602 |
| −180 degrees | R-HRTF (−180 degrees) | L-HRTF (−180 degrees) |
| −175 degrees | R-HRTF (−175 degrees) | L-HRTF (−175 degrees) |
| ⋮ | ⋮ | ⋮ |
| 0 degrees | R-HRTF (0 degrees) | L-HRTF (0 degrees) |
| 5 degrees | R-HRTF (5 degrees) | L-HRTF (5 degrees) |
| ⋮ | ⋮ | ⋮ |
| 180 degrees | R-HRTF (180 degrees) | L-HRTF (180 degrees) |

SIGNAL GENERATING APPARATUS, VEHICLE, AND COMPUTER-IMPLEMENTED METHOD OF GENERATING SIGNALS

CROSS REFERENCE TO RELATED APPLICATION

This application is based on, and claims priority from, Japanese Patent Application No. 2021-114159, filed Jul. 9, 2021, the entire content of which is incorporated herein by reference.

BACKGROUND

Technical Field

The present disclosure relates to a signal generating apparatus, to a vehicle, and to a computer-implemented method of generating signals.

Background Information

Non-patent document 1 discloses distance based amplitude panning (DBAP) processing. Non-patent document 1 is "Easy Multichannel Panner, Dbap Implementation" Matsuura Tomoya, Nov. 28, 2018, [online], found Jun. 1, 2021, <https://matsuuratomoya.com/blog/2016-06-17/dbap-implementation/>. In the DBAP processing, sound image localization is controlled by adjusting a volume of each sound emitted from loudspeakers in accordance with a distance between a position of a virtual sound source and a position of each of the loudspeakers.

The DBAP processing described in Non-Patent Document 1 may result in lack of clarity of sound image localization in a closed space.

SUMMARY

An object according to one aspect of the present disclosure is to provide a technique capable of reducing lack of clarity of sound image localization in a closed space.

In one aspect, a signal generating apparatus includes a memory configured to store instructions and a processor communicatively connected to the memory and configured to execute the stored instructions to function as a first generator and a second generator. The first generator is configured to generate a processed signal by adjusting frequency characteristics of an audio signal representative of a sound from a virtual sound source based on a Head-Related Transfer Function (HRTF) corresponding to a target position of the virtual sound source. The second generator is configured to generate, based on the processed signal, a plurality of output signals in one-to-one correspondence with a plurality of loudspeakers, and to perform panning processing to adjust a level of each output signal of the plurality of output signals based on the target position.

In another aspect, a signal generating apparatus includes a memory configured to store instructions and a processor communicatively connected to the memory and configured to execute the stored instructions to function as a signal processor and a generator. The signal processor is configured to generate, based on an audio signal representative of a sound from a virtual sound source, a plurality of signals in one-to-one correspondence with a plurality of loudspeakers, and to generate a plurality of processed signals by performing panning processing to adjust a level of each signal of the plurality of signals based on a target position of the virtual sound source. The generator is configured to generate a plurality of output signals by adjusting frequency characteristics of the plurality of processed signals based on a Head-Related Transfer Function (HRTF) corresponding to the target position.

In yet another aspect, a method of generating signals is a computer-implemented method of generating signals. The computer-implemented method includes generating a processed signal by adjusting frequency characteristics of an audio signal representative of a sound from a virtual sound source based on a Head-Related Transfer Function (HRTF) corresponding to a target position of the virtual sound source, generating, based on the processed signal, a plurality of output signals in one-to-one correspondence with a plurality of loudspeakers, and performing panning processing to adjust a level of each output signal of the plurality of output signals based on the target position.

DESCRIPTION OF THE EMBODIMENTS

A: First Embodiment

A1: Signal Generating Apparatus 1

Figure 1:
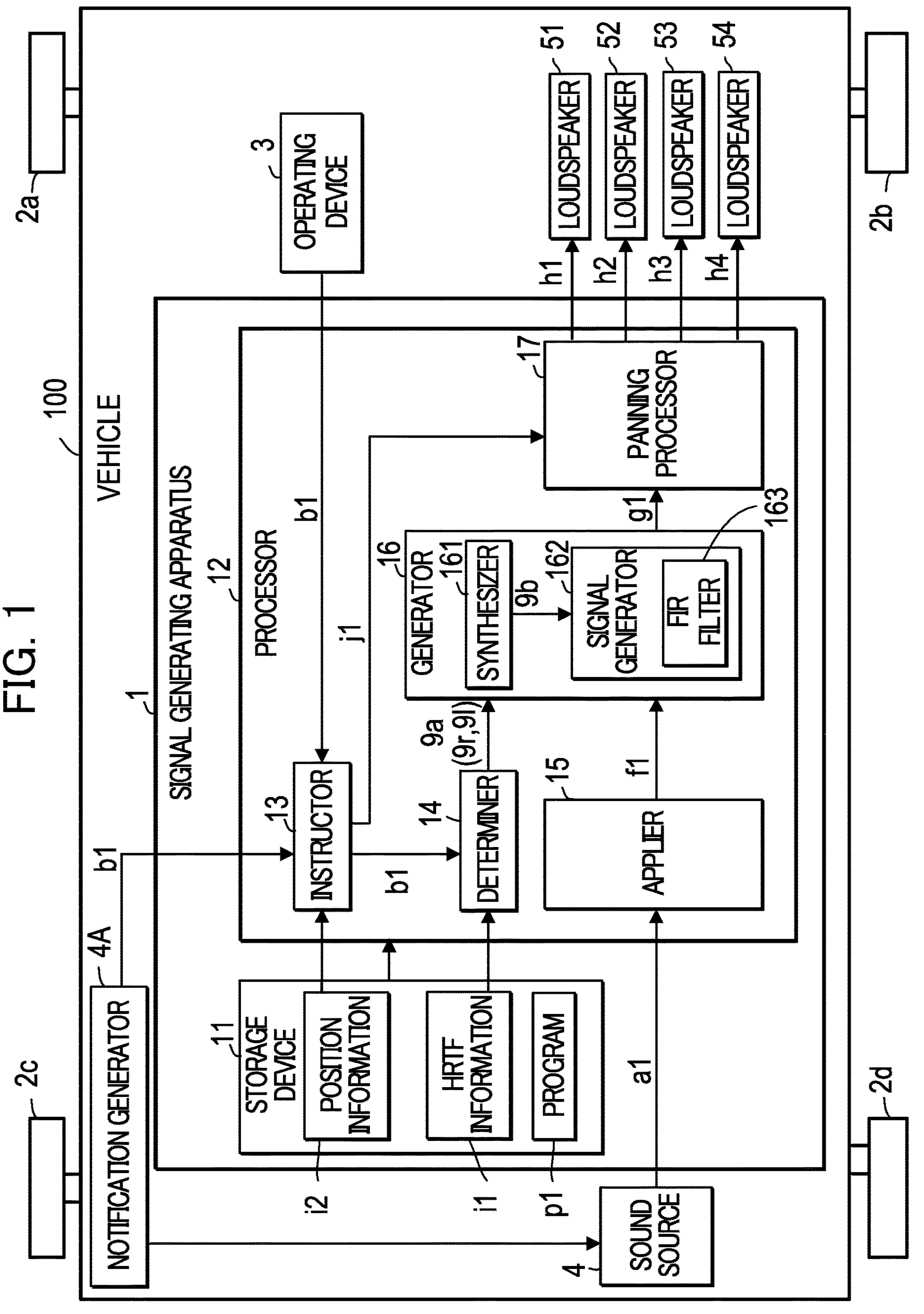
FIG. 1 is a diagram showing an example of a signal generating apparatus 1 according to a first embodiment.

FIG. 1 is a diagram showing an example of a signal generating apparatus 1 according to a first embodiment. The signal generating apparatus 1 is installed in a vehicle 100. The vehicle 100 includes the signal generating apparatus 1, wheels 2*a* to 2*d*, an operating device 3, a sound source 4, a notification generator 4A, and loudspeakers 51 to 54.

The signal generating apparatus 1 generates output signals h1 to h4 in one-to-one correspondence with the loudspeakers 51 to 54. The output signal h1 is provided to the loudspeaker 51. The output signal h2 is provided to the loudspeaker 52. The output signal h3 is provided to the loudspeaker 53. The output signal h4 is provided to the loudspeaker 54. The signal generating apparatus 1 uses the output signals h1 to h4 to control sound image localization imaged in accordance with sounds emitted from the loudspeakers 51 to 54. A sound image is a sound source imaged by a person listening to sounds emitted from the loudspeakers 51 to 54. The sound image is an example of a virtual sound source. The sound image localization means a position of the sound image.

The signal generating apparatus 1 controls only the sound image localization imaged by a driver in a driver's seat of the vehicle 100 by using the output signals h1 to h4 to cause the loudspeakers 51 to 54 to emit the sounds. The signal generating apparatus 1 may control sound image localization imaged for an occupant other than the driver in the vehicle 100. The signal generating apparatus 1 may control sound image localization imaged for each occupant in the vehicle 100.

Each of the wheels 2*a* and 2*b* is a front wheel of the vehicle 100. Each of the wheels 2*c* and 2*d* is a rear wheel of the vehicle 100. The vehicle 100 may include one or more wheels in addition to the wheels 2*a* to 2*d*.

The operating device 3 is a touch panel. The operating device 3 is not limited to the touch panel, and it may be a control panel with various operation buttons. The operating device 3 receives operations carried out by at least one occupant in the vehicle 100. The "at least one occupant in the vehicle 100" is hereinafter referred to as a "user."

The sound source 4 generates an audio signal a1. The audio signal a1 indicates a sound by a waveform. The audio signal a1 indicates a musical piece. The audio signal a1 may indicate a sound different from a musical piece, for example, a natural sound such as the sound of waves or a virtual engine sound. The audio signal a1 is a one-channel signal.

The notification generator 4A includes at least one processor. The notification generator 4A generates alerts and various types of information. The notification generator 4A determines, based on information received from one or more devices in the vehicle 100, whether an alert or information is required. Based on determining that an alert or information is required, the notification generator 4A both instructs the sound source 4 to generate the audio signal a1 and generates target position information b1 described below. The one or more devices in the vehicle 100 may include, for example, a measuring device that measures a speed of the vehicle 100, or a detecting device that detects one or more humans around the vehicle 100.

Figures 2, 3:
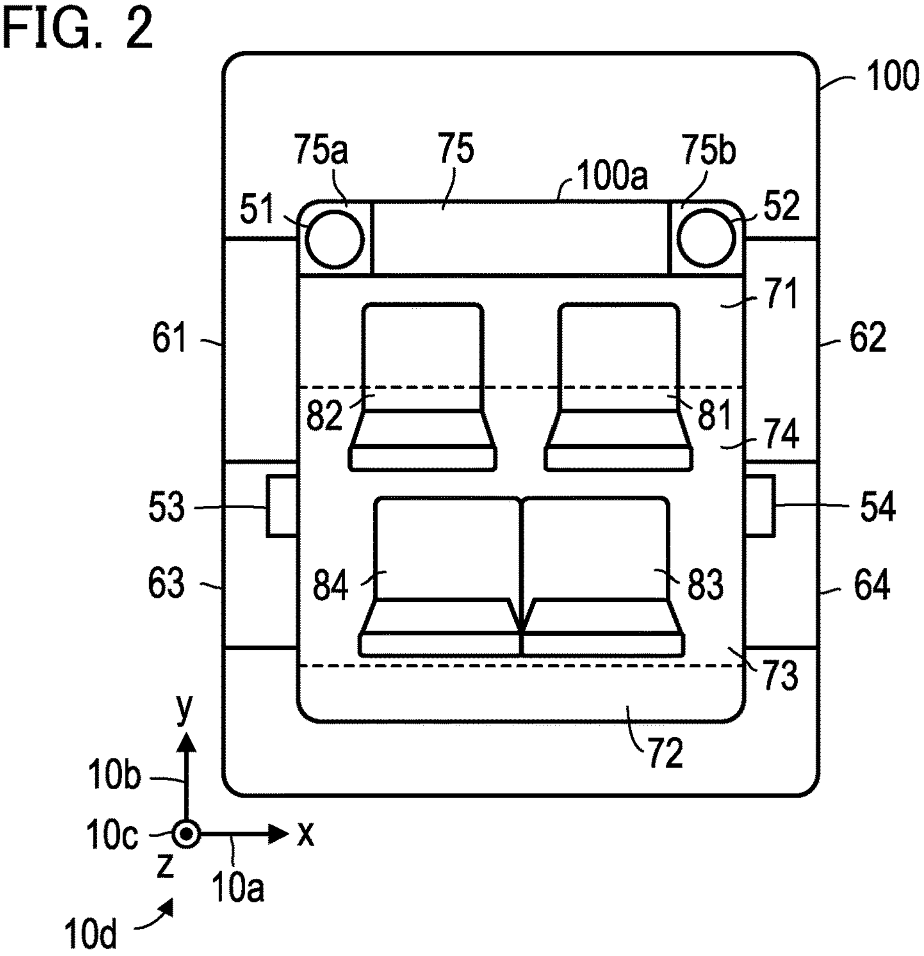
FIG. 2 is a diagram showing an example of a vehicle 100.
FIG. 3 is a diagram showing an example of HRTF information i1.

FIG. 2 is a diagram showing an example of the vehicle 100. FIG. 2 shows an x-axis 10*a*, a y-axis 10*b*, and a z-axis 10*c* in addition to the vehicle 100. The x-axis 10*a* is an axis along a left-right direction of the vehicle 100. The y-axis 10*b* is an axis along a front-back direction of the vehicle 100. The z-axis 10*c* is an axis along an up-down direction of the vehicle 100. The x-axis 10*a*, the y-axis 10*b*, and the z-axis 10*c* define a three-dimensional coordinate system 10*d*.

The vehicle 100 includes an FL door 61, an FR door 62, an RL door 63, an RR door 64, a windshield 71, a rear window 72, a roof panel 73, a floor panel 74, and a compartment 100*a*.

The FL door 61 is a front-left door. The FR door 62 is a front-right door. The RL door 63 is a rear-left door. The RR door 64 is a rear-right door.

The compartment 100*a* includes a closed space. The compartment 100*a* is defined by the FL door 61, the FR door 62, the RL door 63, the RR door 64, the windshield 71, the rear window 72, the roof panel 73, and the floor panel 74, for example. The compartment 100*a* includes the loudspeakers 51 to 54, a dashboard 75, and seats 81 to 84.

The loudspeakers 51 to 54 belong to an example of a plurality of loudspeakers. The plurality of loudspeakers is not limited to four loudspeakers, and it may be two, three, or five or more loudspeakers, for example. Each of the loudspeakers 51 to 54 emits a sound in the compartment 100*a*. The loudspeaker 51 is positioned at a left portion 75*a* of the dashboard 75. The loudspeaker 52 is positioned at a right portion 75*b* of the dashboard 75. The loudspeaker 53 is positioned at the RL door 63. The loudspeaker 54 is positioned at the RR door 64. The sound emitted from each of the loudspeakers 51 to 54 is reflected in the compartment 100*a*. For example, the sound emitted from each of the loudspeakers 51 and 52 is reflected by at least the windshield 71. The positions of the loudspeakers 51 to 54 are not limited to the positions shown in FIG. 2, and they may be changed as necessary.

The seat 81 is a driver's seat. The seat 82 is a passenger's seat. The seat 83 is a right backseat. The seat 84 is a left backseat.

In FIG. 1, the signal generating apparatus 1 includes a storage device 11 and a processor 12. The storage device 11 may be an external element of the signal generating apparatus 1.

The storage device 11 includes one or more computer readable recording mediums (for example, one or more non-transitory computer readable recording mediums). The storage device 11 includes one or more nonvolatile memories and one or more volatile memories. The nonvolatile memories include, for example, a read only memory (ROM), an erasable programmable read only memory (EPROM), and an electrically erasable programmable read only memory (EEPROM). The volatile memory may be, for example, a random access memory (RAM).

The storage device 11 stores Head-Related Transfer Function (HRTF) information i1, position information i2, and a program p1.

The HRTF information i1 is information indicative of an HRTF. The HRTF is a transfer function representative of a change in a sound that travels from a sound source to both ears of a human. The HRTF varies with change in relationship between a position of the sound source and a position of each of the ears. The HRTF reflects a change in a sound caused by body parts of a human, including pinnae of a human, the head of a human, and the shoulders of a human.

FIG. 3 is a diagram showing an example of the HRTF information i1. The HRTF information i1 indicates a set c of HRTFs for each of positions t of a sound source. The set c of HRTFs includes an R-HRTF 601 and an L-HRTF 602. The R-HRTF 601 is an HRTF for the right ear corresponding to the position t. The L-HRTF 602 is an HRTF for the left ear corresponding to the position t. In other words, the R-HRTF 601 is a transfer function representative of a change in a sound that travels from a sound source positioned at the position t to the right ear of a human. The L-HRTF 602 is a transfer function representative of a change in a sound that travels from the sound source positioned at the position t to a left ear of the human. The R-HRTF 601 is generated based on an audio signal output from a first microphone, which is positioned at a right ear of a dummy head of a human dummy, when the first microphone receives a sound (an impulse) emitted from the position t. The L-HRTF 602 is generated based on an audio signal output from a second microphone, which is positioned at the left ear of the dummy head of the human dummy, when the second microphone receives a sound (an impulse) emitted from the position t. Therefore, it is possible to locate a sound image, which is imaged in accordance with a first sound, at a target position, when a sound obtained by adjusting the first sound with the R-HRTF 601 travels to the right ear of the user and a sound obtained by adjusting the first sound with the L-HRTF 602 travels to the left ear of the user.

Figure 4:
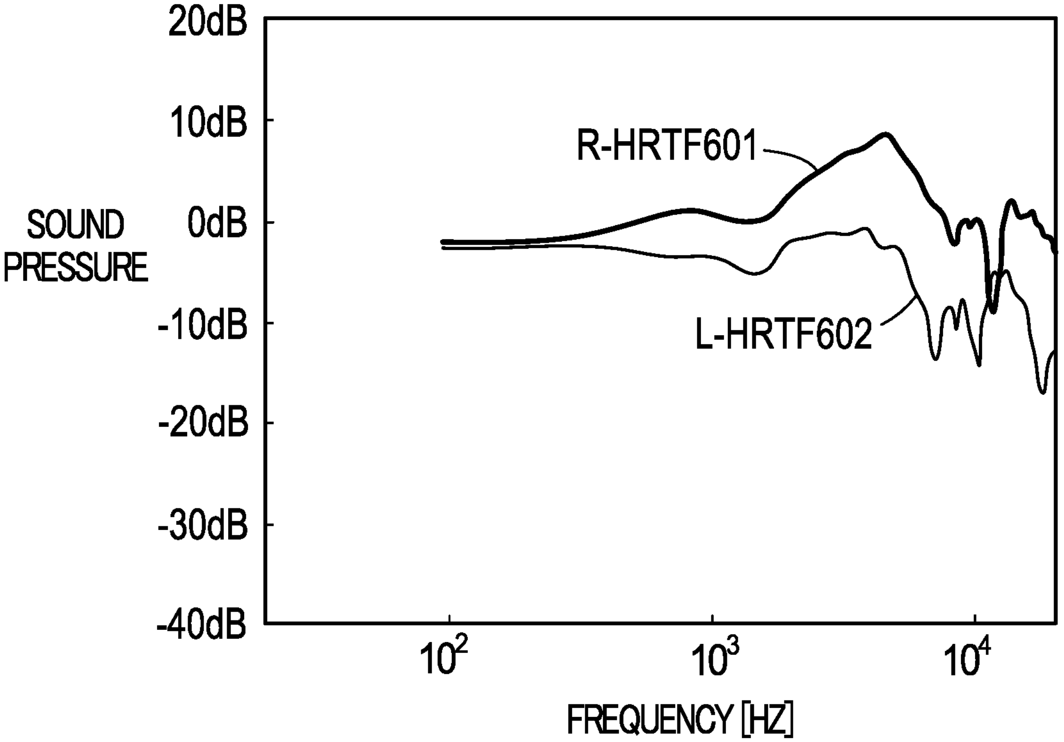
FIG. 4 is a diagram showing an example of a set c of HRTFs.

FIG. 4 is a diagram showing an example of the set c of HRTFs (the R-HRTF 601 and the L-HRTF 602). The set c of HRTFs represents relationships between frequency and sound pressure. The R-HRTF 601 and the L-HRTF 602 each define filter coefficients of a finite impulse response (FIR) filter. For example, the R-HRTF 601 and the L-HRTF 602 each define coefficients (filter coefficients) of a plurality of taps in an FIR filter. The plurality of taps are 512 taps, for example. The plurality of taps is not limited to 512 taps, and it may for example, be 1,024 taps.

Figure 5:
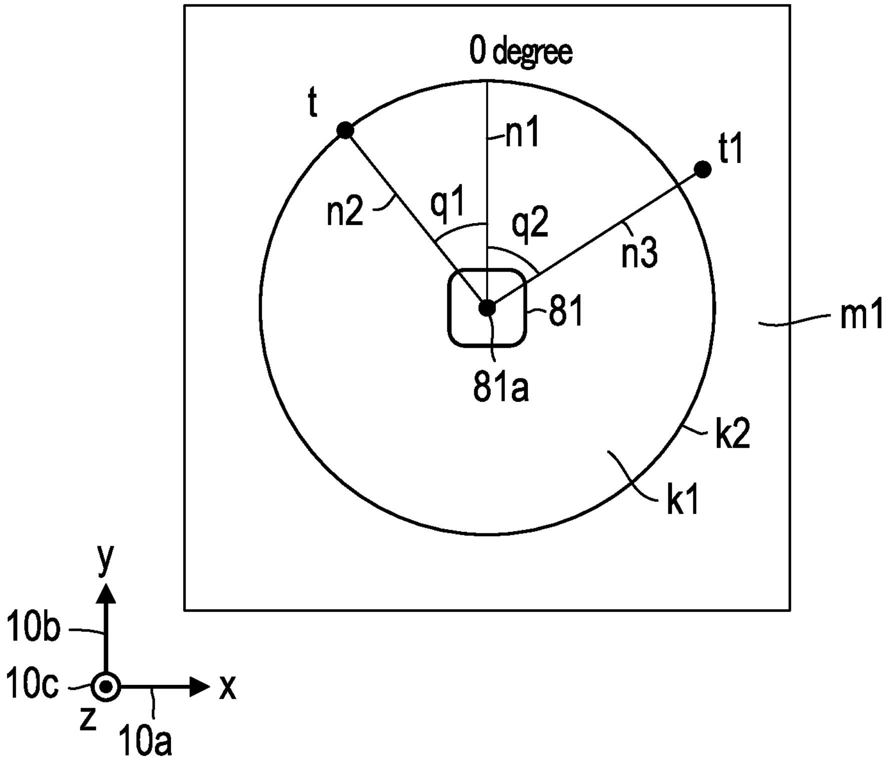
FIG. 5 is a diagram showing examples of positions t of a sound source.

FIG. 5 is a diagram showing examples of the positions t of a sound source. The position t of the sound source is a freely selected position on a circumference k2 of a circle k1. The circle k1 is positioned on a plane m1. The plane m1 is parallel with both the x-axis 10*a* and the y-axis 10. The plane m1 includes a point 81*a* in a seat (driver's seat) 81. The point 81*a* is a center point of the seat 81. The point 81*a* is not limited to the center point of the seat 81, and it may be an end point of the seat 81, for example. The point 81*a* is positioned at a center of the circle k1. The circle k1 has a radius of 1.5 m. The radius of the circle k1 is not limited to 1.5 m, and it may be less than 1.5 m or may be greater than 1.5 m.

FIG. 5 shows a straight line n1 and a straight line n2 in addition to the position t of the sound source. The straight line n1 is a straight line parallel to the y-axis 10*b*. The straight line n1 is a straight line passing through the point 81*a*. The straight line n2 is a straight line passing through both the point 81*a* and the position t of the sound source.

The position t of the sound source is defined by an angle q1. The angle q1 is an angle of inclination of the straight line n2 to the straight line n1. The angle q1 in a counterclockwise direction from the straight line n1 is indicated by a positive (+) value. The angle q1 in a clockwise direction from the straight line n1 is indicated by a negative (−) value.

FIG. 5 further shows a target position t1 of the virtual sound source and a straight line n3. The target position t1 is within a region having vertexes positioned at each of the positions of the loudspeakers 51 to 54. The target position t1 may or may not be positioned on the circumference k2. The straight line n3 is a straight line passing through both the point 81*a* and the target position t1.

The target position t1 is defined by both the angle q2 and a distance between the target position t1 and the point 81*a*. The angle q2 is an angle of inclination of the straight line n3 to the straight line n1. The angle q2 in a counterclockwise direction from the straight line n1 is indicated by a positive (+) value. The angle q2 in a clockwise direction from the straight line n1 is indicated by a negative (−) value.

The HRTF information i1 in FIG. 3 indicates the position t (angle q1) of the sound source every 5 degrees in a range of −180 to 180 degrees. The HRTF information i1 in FIG. 3 may indicate the position t (angle q1) of the sound source at an angle differing from 5 degrees in the range of −180 to 180 degrees.

In FIG. 1, the position information i2 includes speaker position information and position conversion information. The speaker position information is information indicative of a position of each of the loudspeakers 51 to 54. The speaker position information indicates the position of each of the loudspeakers 51 to 54 by using coordinates in the three-dimensional coordinate system 10*d*. The position conversion information indicates relationships between the target position t1, which is indicated by both the angle q2 and the distance (the distance between the target position t1 and the point 81*a*), and the coordinates in the three-dimensional coordinate system 10*d*.

The program p1 defines an operation of the signal generating apparatus 1. The storage device 11 may store the program p1 read from a storage device in a server (not shown). In this case, the storage device in the server is an example of a computer-readable storage medium.

The processor 12 includes one or more central processing units (CPUs). The one or more CPUs are examples of one or more processors. Each of the processor and the CPU is an example of a computer.

The processor 12 reads the program p1 from the storage device 11. The processor 12 executes the program p1 to function as an instructor 13, a determiner 14, an applier 15, a generator 16, and a panning processor 17.

The instructor 13 receives the target position information b1 from the operating device 3 or the notification generator 4A. The target position information b1 is information indicative of the target position t1 (the angle q2 and the distance) of the virtual sound source.

The instructor 13 uses the position conversion information in the position information i2 to determine the coordinates in the three-dimensional coordinate system 10*d* indicative of the target position t1 (the angle q2 and the distance) of the virtual sound source. The instructor 13 generates position-related information j1 including both the target position t1 of the virtual sound source, which is indicated by the coordinates in the three-dimensional coordinate system 10*d*, and the loudspeaker position information in the position information i2.

The instructor 13 provides the position-related information j1 to the panning processor 17. Additionally, the instructor 13 provides the target position information b1 to the determiner 14.

The determiner 14 determines, based on the target position information b1, an HRTF 9a that is an HRTF corresponding to the target position t1 of the virtual sound source. For example, the determiner 14 uses both the target position information b1 and the HRTF information i1 to determine the HRTF 9a. An example of a method of determining the HRTF 9a is described below. The HRTF 9a corresponding to the target position t1 defines a position in a front-back direction of the seat 81 in sound image localization imaged in accordance with the sounds emitted from the loudspeakers 51 to 54 based on the output signals h1 to h4. The front-back direction of the seat 81 means the front-back direction of the vehicle 100.

The determiner 14 provides the HRTF 9a to the generator 16. The HRTF 9a is a two-channel signal including both an R-HRTF 9r and an L-HRTF 9l. The R-HRTF 9r is an HRTF for a right ear corresponding to the target position t1 of the virtual sound source. The L-HRTF 9l is an HRTF for a left ear corresponding to the target position t1 of the virtual sound source.

The applier 15 expands a frequency bandwidth of the audio signal a1 to generate an audio signal f1. For example, the applier 15 generates the audio signal f1 by applying distortion processing to the audio signal a1. The distortion processing is processing in which the frequency bandwidth of the audio signal a1 is expanded by distorting a waveform of the audio signal a1 (by preforming nonlinear transformation processing, etc.). The audio signal f1 includes an audio signal, which indicates higher-order harmonics of a sound indicated by the audio signal a1, in addition to the audio signal a1. The audio signal f1 is a one-channel signal. The applier 15 provides the audio signal f1 to the generator 16. The audio signal f1 is an example of a sound signal indicative of a sound from a virtual sound source. The applier 15 is an example of a third generator.

The generator 16 generates a processed signal g1 by adjusting frequency characteristics of the audio signal f1 based on the HRTF 9a corresponding to the target position t1 of the virtual sound source. For example, the generator 16 generates the processed signal g1 by adjusting the frequency characteristics of the audio signal f1 with the HRTF corresponding to the target position t1 of the virtual sound source. The generator 16 may generate the processed signal g1 by adjusting the frequency characteristics of the audio signal f1 with a result obtained by multiplying the HRTF 9a and a constant w together. The processed signal g1 is a one-channel signal. The generator 16 is an example of a first generator. The generator 16 includes a synthesizer 161 and a signal generator 162.

The synthesizer 161 generates an HRTF 9b based on both the R-HRTF 9*r* and the L-HRTF 9l that are in the HRTF 9a. For example, the synthesizer 161 generates the HRTF 9b by combining the R-HRTF 9r with the L-HRTF 9l. The HRTF 9b is a one-channel signal.

The signal generator 162 generates the processed signal g1 by adjusting the frequency characteristics of the audio signal f1 based on the HRTF 9b. The signal generator 162 includes an FIR filter 163. The FIR filter 163 includes a plurality of taps. Filter coefficients of the FIR filter 163 are defined by the HRTF 9b. The filter coefficients of the filter 163 may be defined by a result obtained by multiplying the HRTF 9b and the constant w together. The FIR filter 163 generates the processed signal g1 by performing convolution processing on the audio signal f1.

The R-HRTF 9r and the L-HRTF 9l, which are included in the HRTF 9a, originally represent a position of a virtual sound source in directions, which include the left-right direction in addition to the front-back direction, surrounding the user. Therefore, combining the R-HRTF 9r with the L-HRTF 9l causes elimination of information indicative of the position of the virtual sound source in the left-right direction. However, this disclosure uses HRTF processing to compensate for weakness (unclear localization in the front-back direction in a specific environment) in DBAP processing described below. Therefore, the elimination of the information indicative of the position of the virtual sound source in the left-right direction causes no problem and also has an advantage in that an amount of filter processing is reduced by half.

The panning processor 17 is an example of a second generator. The panning processor 17 performs panning processing. The panning processor 17 generates the output signals h1 to h4 based on the processed signal g1 in the panning processing. The output signal h1 is an audio signal for a front-left (FL) channel. The output signal h2 is an audio signal for a front-right (FR) channel. The output signal h3 is an audio signal for a rear-left (RL) channel. The output signal h41 is an audio signal for a rear-right (RR) channel. The panning processor 17 adjusts a level of each of the output signals h1 to h4 based on the position-related information j1 in the panning processing.

The panning processing defines at least a position in the left-right direction of the seat 81 in the sound image localization imaged in accordance with the sounds emitted from the loudspeakers 51 to 54 based on the output signals h1 to h4. The left-right direction of the seat 81 means the left-right direction of the vehicle 100.

The panning processor 17 performs the DBAP processing as the panning processing. The DBAP processing is processing for controlling sound image localization by adjusting a volume of each of the sounds, which are emitted from loudspeakers, in accordance with a distance between a position of a virtual sound source and a position of each of the loudspeakers.

A2: Operation of Signal Generating Apparatus 1

Figure 6:
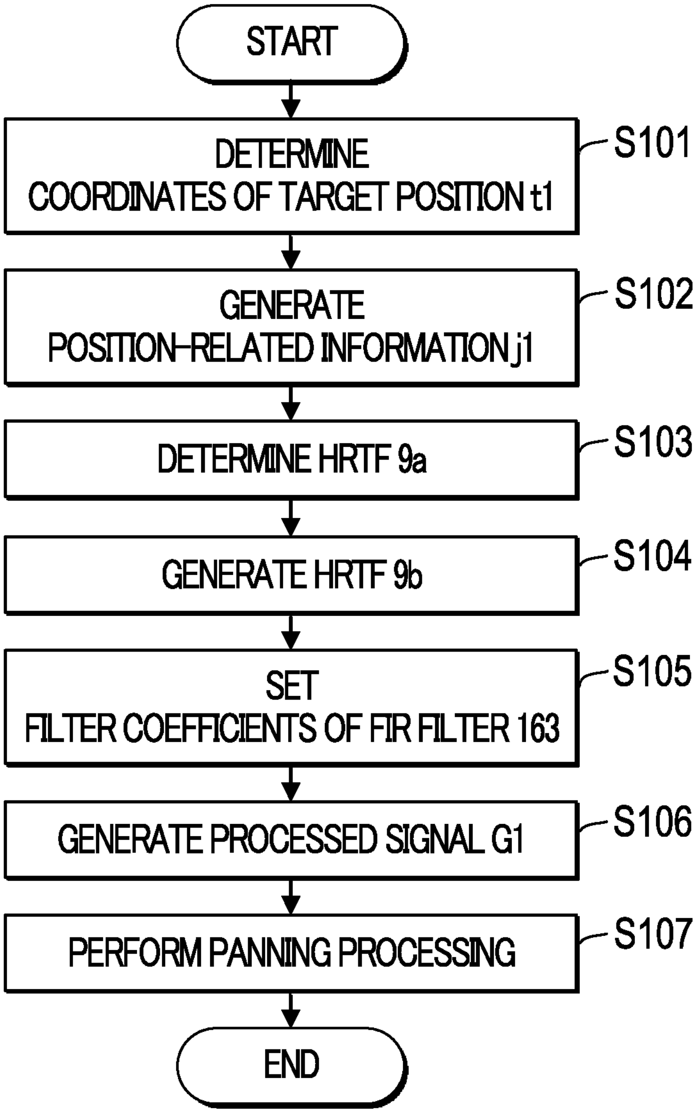
FIG. 6 is a diagram showing an example of an operation of the signal generating apparatus 1.

FIG. 6 is a diagram showing an example of an operation of the signal generating apparatus 1. In the following, the FIR filter 163 includes 512 taps. The R-HRTF 601 and the L-HRTF 602 each indicate coefficients of the 512 taps in the FIR filter 163. The applier 15 generates the audio signal f1.

Upon receipt of an instruction indicative of the target position t1 of the virtual sound source from the user, the operating device 3 provides the target position information b1 to the instructor 13. Alternatively, based on determination that an alert or information should be generated in accordance with the information received from a device in the vehicle 100, the notification generator 4A provides the target location information b1 corresponding to the alert or the information to the instructor 13. The target position information b1 is information indicative of the target position t1 of the virtual sound source with both the angle q2 and the distance described above.

The angle q2 satisfies a condition: "−180 degrees≤q2≤180 degrees." The target position t1 is identified by both the angle q2 and the distance. Based on the instructor 13 receiving the target position information b1, an operation shown in FIG. 6 is started.

In step S101, the instructor 13 uses the position conversion information in the position information i2 to determine the coordinates in the three-dimensional coordinate system 10*d* corresponding to the target position t1 (the angle q2 and the distance) of the virtual sound source indicated by the target position information b1. The position conversion information indicates the relationships between the target position t1 (the angle q2 and the distance) of the virtual sound source and the coordinates in the three-dimensional coordinate system 10*d*.

Then, in step S102, the instructor 13 generates the position-related information j1. The position-related information j1 includes both the target position t1 of the virtual sound source, which is indicated by the coordinates in the three-dimensional coordinate system 10*d*, and the loudspeaker position information in the information i2. The loudspeaker position information indicates the position of each of the loudspeakers 51 to 54 with coordinates in the three-dimensional coordinate system 10*d*. Therefore, the distance between the target position t1 of the virtual sound source and the position of each of the loudspeakers 51 to 54 is determined by using the position-related information j1. The distance between the target position t1 of the virtual sound source and the position of each of the loudspeakers 51 to 54 is required for the DBAP processing.

The instructor 13 then provides the position-related information j1 to the panning processor 17. The instructor 13 then provides the target position information b1 to the determiner 14. The target position information b1 may be provided before the position-related information j1 is provided.

Then, in step S103, the determiner 14 determines, based on the target position information b1, the HRTF 9a corresponding to the target position t1 of the virtual sound source.

In step S103, the determiner 14 reads, based on the angle q2 indicated (for example, in 1-degree increments) by the target position information b1, two sets c of HRTFs (for example, in 5-degree increments) from the HRTF information i1. The two sets c of HRTFs include a first set c of HRTFs and a second set c of HRTFs. The first set c of HRTFs corresponds to a first angle. The second set c of HRTFs corresponds to a second angle. The angle q2 is between the first angle and the second angle. The determiner 14 determines the HRTF 9a by performing an interpolation operation on the two sets c of HRTFs. The determiner 14 uses a linear interpolation operation as the interpolation operation. The interpolation operation is not limited to a linear interpolation operation. For example, the interpolation operation may be a spline interpolation operation.

The determiner 14 then provides the HRTF 9a corresponding to the target position t1 of the virtual sound source to the synthesizer 161.

Then, in step S104, the synthesizer 161 generates the HRTF 9b by combining the R-HRTF 9r in the HRTF 9a with the L-HRTF 9l in the HRTF 9a.

In step S104, the synthesizer 161 generates the HRTF 9b by adding the R-HRTF 9r to the L-HRTF 9l. The synthesizer 161 may generate the HRTF 9b by dividing two into a HRTF obtained by adding the R-HRTF 9r to the L-HRTF 9l. The synthesizer 161 may generate the HRTF 9b by adding a HRTF, which is obtained by multiplying the R-HRTF 9r and a first constant together, to a HRTF which is obtained by multiplying the L-HRTF 9l and a second constant together. The first constant may be equal to or different from the second constant.

Then, in step S105, the synthesizer 161 sets the filter coefficients of the FIR filter 163 using the HRTF 9b. For example, the synthesizer 161 sets the coefficients indicated by the HRTF 9b to the 512 taps in the FIR filter 163.

Then, in step S106, the FIR filter 163 generates the processed signal g1 by performing the convolution processing on the audio signal f1. The FIR filter 163 then provides the processed signal g1 to the panning processor 17.

Then, in step S107, the panning processor 17 performs, based on the position-related information j1, the panning processing on the processed signal g1.

In step S107, the panning processor 17 performs the DBAP processing as the panning processing. The DBAP processing will be described below. First, the panning processor 17 determines, based on the position-related information j1, the distance between the target position t1 of the virtual sound source and the position of each of the loudspeakers 51 to 54. Then, the panning processor 17 divides the processed signal g1 into the output signals h1 to h4. The panning processor 17 then adjusts the level of each of the output signals h1 to h4 individually based on the distance between the target position t1 of the virtual sound source and the position of each of the loudspeakers 51 to 54. For example, the panning processor 17 adjusts the level of each of the output signals h1 to h4 individually based on a distance in the left-right direction of the seat 82 between the target position t1 of the virtual sound source and the position of each of the loudspeakers 51 to 54. Since the DBAP processing is a known technique, a detailed explanation of the DBAP processing is omitted.

The panning processor 17 provides the output signal h1 (FL channel audio signal) having the adjusted level to the loudspeaker 51. The panning processor 17 provides the output signal h2 (FR channel audio signal) having the adjusted level to the loudspeaker 52. The panning processor 17 provides the output signal h3 (RL channel audio signal) having the adjusted level to the loudspeaker 53. The panning processor 17 provides the output signal h4 (RR channel audio signal) having the adjusted level to the loudspeaker 54.

The loudspeakers 51 to 54 emit the sounds based on the output signals h1 to h4 having the adjusted levels.

The sounds emitted from the loudspeakers 51 to 54 are affected by both the processing based on the HRTF 9b and the panning processing. Therefore, a user in the seat 81 can perceive the sounds emitted from the loudspeakers 51 to 54 as sounds emitted from the virtual sound source positioned at the target position t1. In other words, the user in the seat 81 can image a sound image positioned at the target position t1 of the virtual sound source.

Figure 7:
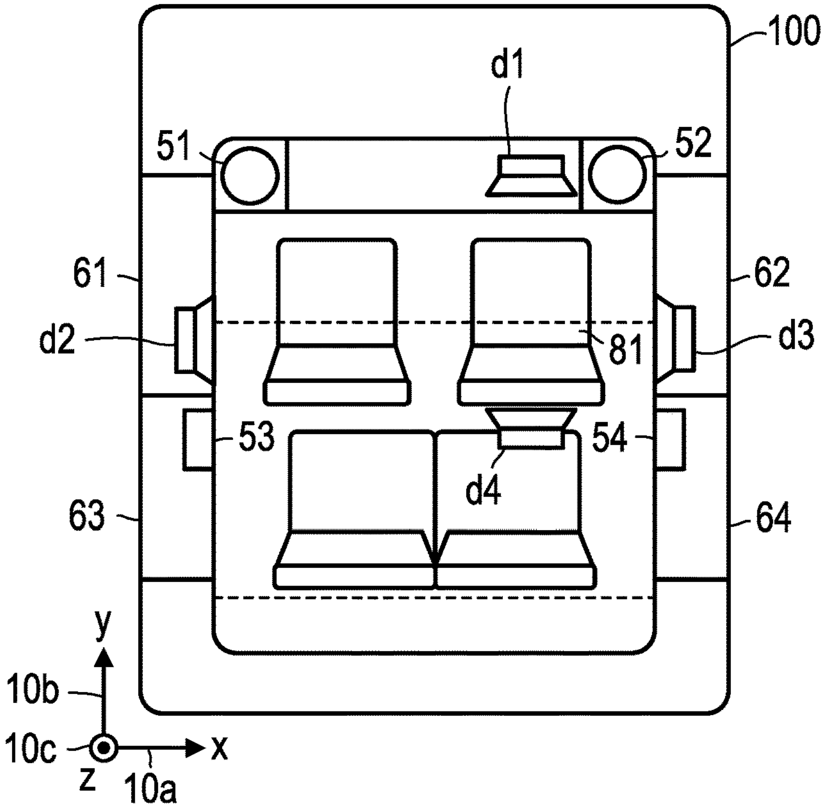
FIG. 7 is a diagram showing target positions d1 to d4 of a virtual sound source in a situation in which only DBAP processing is performed.
Figure 8:
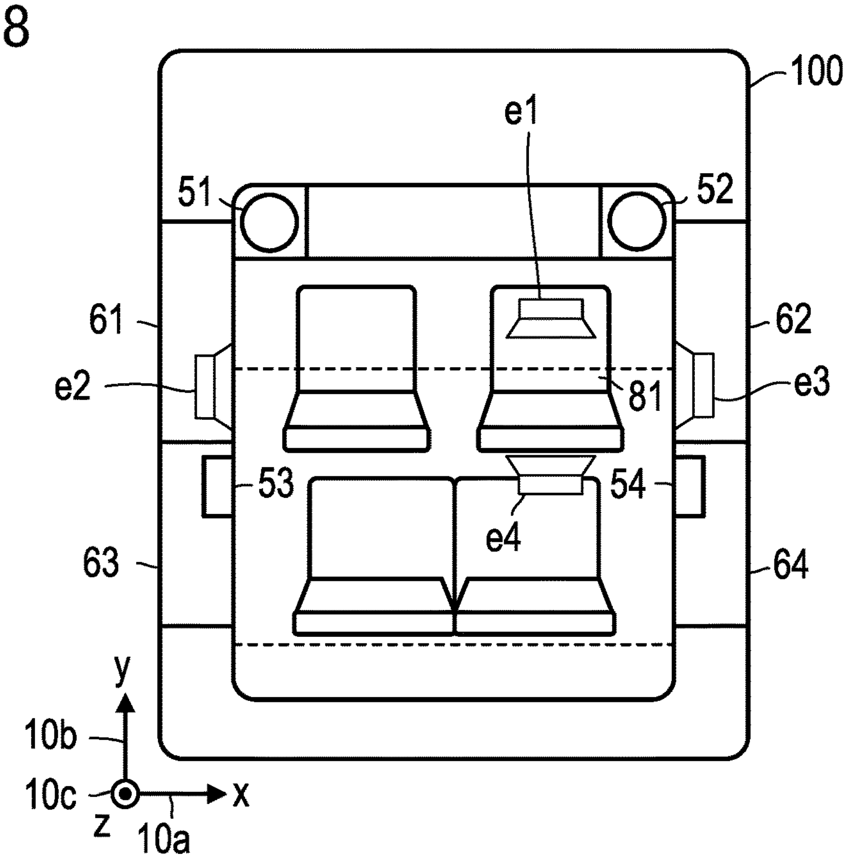
FIG. 8 is a diagram showing actual positions e1 to e4 of the virtual sound source in the situation in which only the DBAP processing is performed.

FIG. 7 is a diagram showing each of target positions d1 to d4 (assumed sound image localization) of the virtual sound source in an only DBAP situation. The only DBAP situation is a situation in the compartment 100*a* in which only the DBAP processing is performed, whereas the processing based on the HRTF 9b is not performed. FIG. 8 is a diagram showing actual positions e1 to e4 (actual sound image localization) of the virtual sound source in the only DBAP situation. Note that in the only DBAP situation, the DBAP processing is performed on the audio signal a1 output from the sound source 4.

When the position d1 is set as a target position t1 of the virtual sound source in the only DBAP situation, the actual position of the virtual sound source (sound image) is at the position e1. When the position d2 is set as a target position t1 of the virtual sound source in the only DBAP situation, the actual position of the virtual sound source (sound image) is at the position e2. When the position d3 is set as a target position t1 of the virtual sound source in the only DBAP situation, the actual position of the virtual sound source (sound image) is at the position e3. When the position d4 is set as a target position t1 of the virtual sound source in the only DBAP situation, the actual position of the virtual sound source (sound image) is at the position e4.

In the only DBAP situation, the following problems occur. When the loudspeaker is panned from left to right in front of the seat 81, the user in the seat 81 perceives muffled sounds due to the reflection of sounds in the compartment 100*a*. Therefore, a person may not perceive that the sound image is positioned in front of the person. In particular, in an area that is in front of the seat 81 and that is to the right from a center in the left-right direction of the vehicle 100, the sound image seems to be positioned within the head of the user. Therefore, it is difficult for the user to perceive that the sound image is positioned in front of the user. Also, in the area being right from the seat 81, the loudspeaker is too near the user in the seat 81. Therefore the FR channel sound and the RR channel sound do not mix. Consequently, the sound image localization is unclear.

In this embodiment (in a situation in which both the processing based on the HRTF 9a and the DBAP processing are performed), the actual position of the virtual sound source (actual sound image localization) is much the same as the target position of the virtual sound source (targeted sound image localization).

This embodiment has the following advantages compared to the only DBAP situation. In both an area in front of the seat 81 and an area that is in front of the seat 81 and that is to the right from the center in the left-right direction of the vehicle 100, the user in the seat 81 has a tendency to perceive that a sound image is positioned in front of the user. In the area that is to the right from the seat 81, sound image localization is improved. In other directions, a direction from the seat 81 toward the sound image is clear.

In this embodiment, the processing based on the HRTF 9a is performed on the audio signal f1 generated by expanding the frequency bandwidth of the audio signal a1. Therefore, the frequency band of the audio signal a1 that is affected by the HRTF 9a increases compared to a configuration in which the processing based on the HRTF 9a is performed on the audio signal a1. Consequently, the sound image is sharp compared to the configuration in which the processing based on the HRTF 9a is performed on the audio signal a1.

A3: Summary of First Embodiment

The generator 16 generates the processed signal g1 by adjusting the frequency characteristics of the audio signal f1 based on the HRTF 9a corresponding to the target position t1 of the virtual sound source. The panning processor 17 performs the panning processing. In the panning processing, the output signals h1 to h4 are generated based on the processed signal g1, and the level of each of the output signals h1 to h4 is adjusted based on the target position t1 of the virtual sound source.

Therefore, it is possible to reduce lack of clarity of sound image localization in a closed space compared to a configuration in which the panning processing is performed without adjustment based on the HRTF 9a (HRTF-based adjustment).

B: Modifications

The following are examples of modifications of the first embodiment. Two or more modifications freely selected from the following modifications may be combined as long as no conflict arises from such combination.

B1: First Modification

In the first embodiment, the generator 16 may use the R-HRTF 9r or the L-HRTF 9l instead of the HRTF 9b. In the first modification, the generator 16 includes a setter instead of the synthesizer 161. The setter sets the filter coefficients of the FIR filter 163 using the R-HRTF 9r or the L-HRTF 9l. For example, the setter sets the coefficients indicated by the R-HRTF 9r or the L-HRTF 9l to the taps in the FIR filter 163. In this case, an example of the HRTF corresponding to the target position is a HRTF used to set the filter coefficients of the FIR filter 163 from among the R-HRTF 9r or the L-HRTF 9l.

According to the first modification, compared to the first embodiment in which the HRTF 9b is generated by combining the R-HRTF 9r with the L-HRTF 9l, the combining processing can be omitted.

In the first embodiment, the HRTF9b is generated by combining the R-HRTF9r with the L-HRTF 9l. Therefore, the HRTF9b is complicated in the relationship between frequency and sound pressure compared to the R-HRTF 9r and the L-HRTF 9l. With an increase in complexity of the relationship between frequency and sound pressure in a HRTF used to set the filter coefficients of the FIR filter 163, probability increases that a sound in accordance with a signal generated by the FIR filter 163 will be perceived, thereby affecting sound image localization. Therefore, the first embodiment can locate the sound image at the target position t1 of the virtual sound source compared to the first modification.

B2: Second Modification

The audible frequency range that humans can perceive is limited. For example, men in their 40 s tend to have difficulty hearing sounds with frequencies higher than 12 kHz. Therefore, when the applier 15 expands the frequency bandwidth of the audio signal a1 in a situation in which the highest frequency of all the frequencies in the audio signal a1 is greater than a threshold (for example, 12 kHz), the user may not hear a sound with the expanded frequency bandwidth.

Therefore, in the first embodiment and the first modification, the applier 15 may expand the frequency bandwidth of the audio signal a1 only when the highest frequency of all the frequencies in the audio signal a1 is less than a threshold (for example, 12 kHz). The threshold is not limited to 12 kHz, and it may be changed as necessary.

According to the second modification, it is possible to restrict the applier 15 from performing operations that are less important (operations that have little effect on sound image localization).

B3: Third Modification

In the first embodiment and the first modification, the applier 15 may be omitted. In this case, the audio signal a1, instead of the audio signal f1, is provided to the generator 16.

According to the third modification, the processing load can be reduced and the configuration can be simplified compared to the configuration including the applier 15.

B4: Fourth Modification

In the first embodiment and the first through third modifications, the panning processor 17 may perform, as panning processing, vector based amplitude panning (VBAP) processing instead of the DBAP processing.

According to the fourth modification, even if the VBAP processing is used as the panning processing, it is possible to reduce lack of clarity of sound image localization in a closed space compared to a configuration in which the panning processing is performed without adjustment based on the HRTF 9a.

B5: Fifth Modification

In the first embodiment and the first through fourth modifications, after the processing based on the HRTF is performed, the panning processing is performed. In the first embodiment and the first through fourth modifications, after the panning processing is performed, the processing based on the HRTF may be performed.

Figure 9:
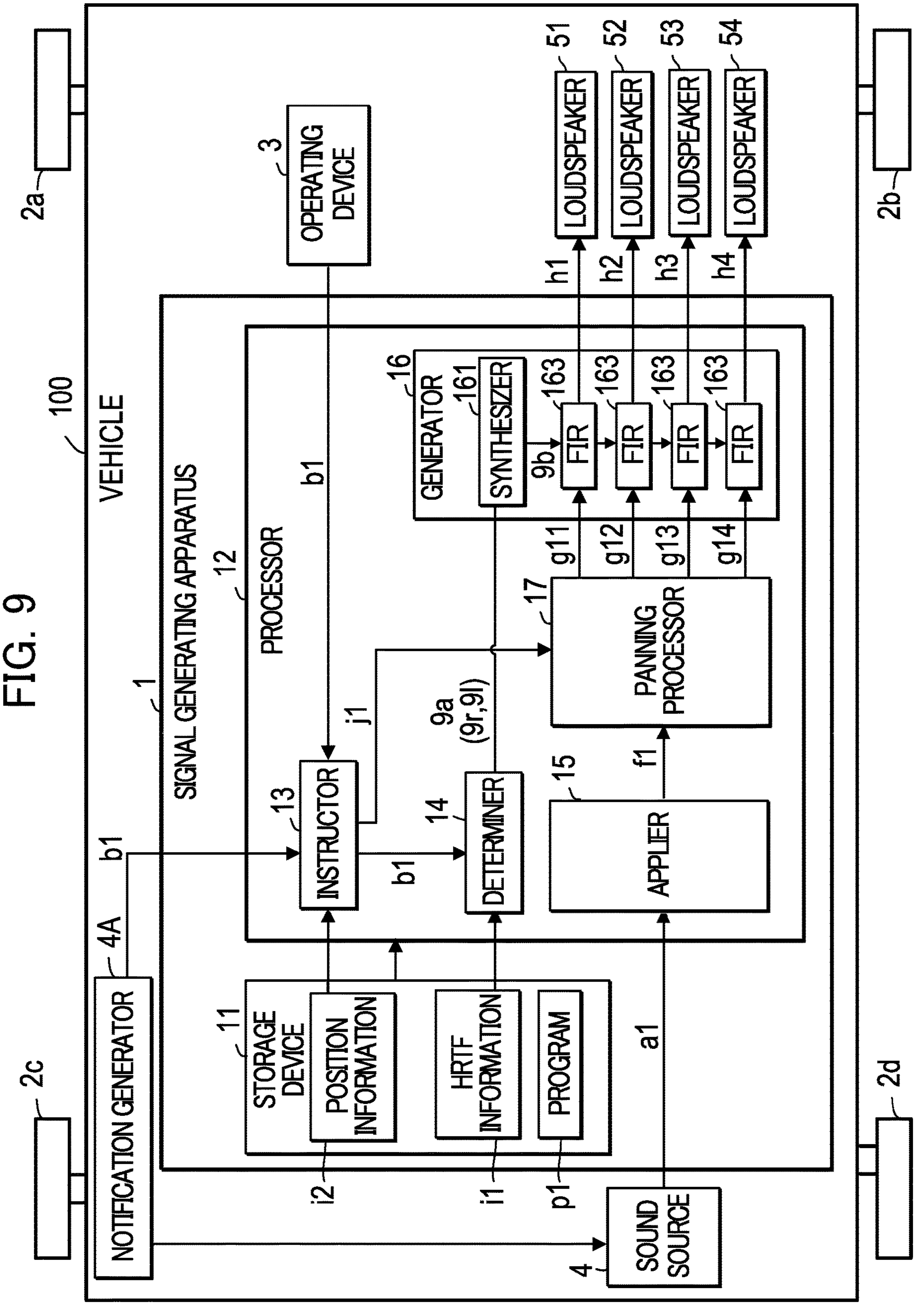
FIG. 9 is a diagram showing an example of a modification.

FIG. 9 is a diagram showing an example of a fifth modification. The panning processor 17 in the fifth modification performs the panning processing on the audio signal f1 to generate a plurality of processed signal g11 to g14. The plurality of processed signals g11 to g14 is an example of a plurality of processed signals. The number of processing signals is not limited to four, as long as the number of processing signals is the same as the number of loudspeakers. The panning processing in the fifth modification is, for example, DBAP processing or VBAP processing.

In the panning processing in the fifth modification, four signals in one-to-one correspondence with the loudspeakers 51 to 54 are generated based on the audio signal f1, and the level of each of the four signals is adjusted based on the target position t1 of the virtual sound source. The four signals belong to an example of a plurality of signals. The number of signals is not limited to four as long as the number of signals is the same as the number of loudspeakers. The plurality of signals (four signals) are generated by dividing the audio signal f1. The processed signals g11 to g14 are four signals, each of which has a level individually adjusted based on the target position t1 of the virtual sound source.

In the fifth modification, the generator 16 generates the output signals h1 to h4 by adjusting frequency characteristics of the plurality of processed signals g11 to g14 based on the HRTF 9b corresponding to the target position t1.

The generator 16 in the fifth modification includes the synthesizer 161 and four FIR filters 163. The four FIR filters 163 are in one-to-one correspondence with the processed signals g11 to g14. The four FIR Filters 163 are in one-to-one correspondence with the output signals h1 to h4. The synthesizer 161 sets filter coefficients of each of the four FIR filters 163 based on the HRTF 9a. Each of the four FIR filters 163 generates the corresponding output signal by performing convolution processing on the corresponding processed signal.

According to the fifth modification, as in the first embodiment, it is possible to reduce lack of clarity of sound image localization in a closed space compared to a configuration in which the panning processing is performed without adjustment based on the HRTF 9a.

In the fifth modification, after the panning processing is performed, the processing based on the HRTF is performed. In contrast, in the first embodiment and the first through fourth modifications, after the processing based on the HRTF is performed, the panning processing is performed. Therefore, the number of FIR filters 163 in the first embodiment and the first through fourth modifications is less than the number of FIR filters 163 in the fifth modification. Consequently, according to the first embodiment and the first through fourth modifications, the processing load can be reduced and the configuration can be simplified compared to the fifth modification.

B6: Sixth Modification

In the first embodiment and the first through fifth modifications, the enclosed space is not limited to the compartment 100*a*, and it may be an interior room, for example.

C: Aspects Derivable From the Embodiment and the Modifications Described Above The following configurations are derivable from at least one of the embodiment and the modifications described above.

C1: First Aspect

A signal generating apparatus according to one aspect (first aspect) of the present disclosure includes a memory configured to store instructions; and a processor communicatively connected to the memory and configured to execute the stored instructions to function as a first generator and a second generator. The first generator is configured to generate a processed signal by adjusting frequency characteristics of an audio signal representative of a sound from a virtual sound source based on a Head-Related Transfer Function (HRTF) corresponding to a target position of the virtual sound source. The second generator is configured to generate, based on the processed signal, a plurality of output signals in one-to-one correspondence with a plurality of loudspeakers, and perform panning processing to adjust a level of each output signal of the plurality of output signals based on the target position.

According to this aspect, it is possible to reduce lack of clarity of sound image localization in a closed space compared to a configuration in which panning processing is performed without HRTF-based adjustment. In a configuration in which the HRTF-based adjustment is performed after the panning processing is performed, it is necessary to perform the HRTF-based adjustment on a plurality of signals generated through the panning processing. On the other hand, according to this aspect, it is not necessary to perform the HRTF-based adjustment for each of the plurality of signals generated through the panning processing, thereby reducing the processing load.

C2: Second Aspect

In an example (second aspect) of the first aspect, the HRTF corresponding to the target position is a right-HRTF (R-HRTF) or a left-HRTF (L-HRTF). The R-HRTF is an HRTF for a right ear corresponding to the target position. The L-HRTF is an HRTF for a left ear corresponding to the target position. According to this aspect, compared to a configuration in which the HRTF is generated by combining the R-HRTF with the L-HRTF, the combining processing can be omitted, thereby reducing the processing load.

C3: Third Aspect

In an example (third aspect) of the first aspect, the HRTF corresponding to the target position includes a right-HRTF (R-HRTF) and a left-HRTF (L-HRTF). The R-HRTF is an HRTF for a right ear corresponding to the target position. The L-HRTF is an HRTF for a left ear corresponding to the target position. The first generator includes a synthesizer and a signal generator. The synthesizer is configured to generate an HRTF based on both the R-HRTF and the L-HRTF. The signal generator is configured to generate the processed signal by adjusting the frequency characteristics of the audio signal based on the HRTF generated by the synthesizer.

The HRTF generated by the synthesizer has a tendency to include gaps affecting sound image localization compared to the R-HRTF and the L-HRTF. Therefore, according to this aspect, the sound image localization is improved in accuracy compared to a configuration in which adjustment is preformed based on the R-HRTF or the L-HRTF. In case in which the R-HRTF and the L-HRTF are combined, the combining processing reduces an amount of processing performed by the FIR filter by half.

C4: Fourth Aspect

In an example (fourth aspect) of any one of the first to the third aspects, the HRTF corresponding to the target position defines a position in a front-back direction of a seat in sound image localization imaged in accordance with sounds emitted from the plurality of loudspeakers based on the plurality of output signals. The panning processing defines a position in a left-right direction of the seat in the sound image localization. According to this aspect, the position of the sound image in the front-back direction of a seat, which is difficult to be determined by the panning processing, is determined by using the HRTF. Therefore, the difference between the position of the sound image and the target position can be small compared to a configuration that uses only the panning processing without using the HRTF.

C5: Fifth Aspect

In an example (fifth aspect) of any one of the first to the fourth aspects, the processor is further configured to execute the stored instructions to function as a third generator configured to generate the audio signal by expanding a frequency bandwidth of a signal indicative of a sound. The first generator is configured to generate the processed signal by adjusting the frequency characteristics of the audio signal generated by the third generator based on the HRTF corresponding to the target position. According to this aspect, the frequency band of the signal affected by the HRTF is increased. Therefore, the sound image localization due to the HRTF easily occurs.

C6: Sixth Aspect

A vehicle according to one aspect (sixth aspect) of the present disclosure includes a plurality of loudspeakers, a seat, and a signal generating apparatus. The signal generating apparatus includes a memory configured to store instructions and a processor communicatively connected to the memory and configured to execute the stored instructions to function as a first generator and a second generator. The first generator is configured to generate a processed signal by adjusting frequency characteristics of an audio signal representative of a sound from a virtual sound source based on a Head-Related Transfer Function (HRTF) corresponding to a target position of the virtual sound source. The second generator is configured to generate, based on the processed signal, a plurality of output signals in one-to-one correspondence with the plurality of loudspeakers, and perform panning processing to adjust a level of each output signal of the plurality of output signals based on the target position. The HRTF corresponding to the target position defines a position in a front-back direction of the seat in sound image localization imaged in accordance with sounds emitted from the plurality of loudspeakers based on the plurality of output signals. The panning processing defines a position in a left-right direction of the seat in the sound image localization. According to this aspect, it is possible to reduce lack of clarity of sound image localization in the vehicle.

C7: Seventh Aspect

A signal generating apparatus according to one aspect (seventh aspect) of the present disclosure includes a memory configured to store instructions and a processor communicatively connected to the memory and configured to execute the stored instructions to function as a signal processor and a generator. The signal processor is configured to generate, based on an audio signal representative of a sound from a virtual sound source, a plurality of signals in one-to-one correspondence with a plurality of loudspeakers, and generate a plurality of processed signals by performing panning processing to adjust a level of each signal of the plurality of signals based on a target position of the virtual sound source. The generator is configured to generate a plurality of output signals by adjusting frequency characteristics of the plurality of processed signals based on a Head-Related Transfer Function (HRTF) corresponding to the target position. According to this aspect, it is possible to reduce lack of clarity of sound image localization in a closed space compared to a configuration in which panning processing is performed without HRTF-based adjustment.

C8: Eighth Aspect

A method of generating signals according to one aspect (eighth aspect) of the present disclosure is a computer-implemented method of generating signals. The computer-implemented method includes generating a processed signal by adjusting frequency characteristics of an audio signal representative of a sound from a virtual sound source based on a Head-Related Transfer Function (HRTF) corresponding to a target position of the virtual sound source, generating, based on the processed signal, a plurality of output signals in one-to-one correspondence with a plurality of loudspeakers, and performing panning processing to adjust a level of each output signal of the plurality of output signals based on the target position. According to this aspect, it is possible to reduce lack of clarity of sound image localization in a closed space compared to a configuration in which panning processing is performed without HRTF-based adjustment.

DESCRIPTION OF REFERENCE SIGNS

1 . . . signal generating apparatus, 3 . . . operating device, 4 . . . sound source, 11 . . . storage device, 12 . . . processor, 13 . . . instructor, 14 . . . determiner, 15 . . . applier, 16 . . . generator, 161 . . . synthesizer, 162 . . . signal generator, 163 . . . FIR filter, 17 . . . panning processor, 51 to 54 . . . loudspeakers, 81 to 84 . . . seats, 100 . . . vehicle.

What is claimed is:

1. A signal generating apparatus comprising:
a memory configured to store instructions; and
a processor communicatively connected to the memory and configured to execute the stored instructions to function as:
a first generator configured to generate a processed signal by adjusting frequency characteristics of an audio signal representative of a sound from a virtual sound source based on a Head-Related Transfer Function (HRTF) corresponding to a target position of the virtual sound source;
a second generator configured to:
generate, based on the processed signal, a plurality of output signals in one-to-one correspondence with a plurality of loudspeakers; and
perform panning processing to adjust a level of each output signal of the plurality of output signals based on the target position; and
a third generator configured to generate the audio signal by expanding a frequency bandwidth of a signal indicative of a sound,
wherein the first generator is configured to generate the processed signal by adjusting the frequency characteristics of the audio signal generated by the third generator based on the HRTF corresponding to the target position.

2. The signal generating apparatus according to claim 1, wherein:
the HRTF corresponding to the target position is a right-HRTF (R-HRTF) or a left-HRTF (L-HRTF),
the R-HRTF is an HRTF for a right ear corresponding to the target position, and
the L-HRTF is an HRTF for a left ear corresponding to the target position.

3. The signal generating apparatus according to claim 1, wherein:
the HRTF corresponding to the target position includes a right-HRTF (R-HRTF) and a left-HRTF (L-HRTF),
the R-HRTF is an HRTF for a right ear corresponding to the target position,
the L-HRTF is an HRTF for a left ear corresponding to the target position, and the first generator includes:
a synthesizer configured to generate an HRTF based on the R-HRTF and the L-HRTF; and
a signal generator configured to generate the processed signal by adjusting the frequency characteristics of the audio signal based on the HRTF generated by the synthesizer.

4. A signal generating apparatus comprising:

a memory configured to store instructions; and a processor communicatively connected to the memory and configured to execute the stored instructions to function as:

a signal processor configured to:

generate, based on an audio signal representative of a sound from a virtual sound source, a plurality of signals in one-to-one correspondence with a plurality of loudspeakers; and generate a plurality of processed signals by performing panning processing to adjust a level of each signal of the plurality of signals based on a target position of the virtual sound source; and a generator configured to generate a plurality of output signals by adjusting frequency characteristics of the plurality of processed signals based on a Head-Related Transfer Function (HRTF) corresponding to the target position, wherein the processor is configured to execute the stored instructions to generate the audio signal by expanding a frequency bandwidth of a signal indicative of a sound, and wherein the signal processor is configured to generate, based on the audio signal generated by expanding the frequency bandwidth of the signal indicative of the sound, the plurality of signals in one-to-one correspondence with the plurality of loudspeakers.

5. A computer-implemented method of generating signals, the method comprising:

generating an audio signal by expanding a frequency bandwidth of a signal indicative of a sound, generating a processed signal by adjusting frequency characteristics of the audio signal representative of a sound from a virtual sound source based on a Head-Related Transfer Function (HRTF) corresponding to a target position of the virtual sound source;

generating, based on the processed signal, a plurality of output signals in one-to-one correspondence with a plurality of loudspeakers; and performing panning processing to adjust a level of each output signal of the plurality of output signals based on the target position, wherein the generating of the processed signal includes generating the processed signal by adjusting, based on the HRTF corresponding to the target position, the frequency characteristics of the audio signal generated by expanding the frequency bandwidth of the signal indicative of the sound.

* * * * *